US008111995B2

(12) United States Patent
Wisseman (10) Patent No.: US 8,111,995 B2
(45) Date of Patent: *Feb. 7, 2012

(54) SHARED, COLORLESS ADD/DROP CONFIGURATION FOR A ROADM NETWORK USING M×N WAVELENGTH SWITCHES

(75) Inventor: Philip Wisseman, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 444 days.

This patent is subject to a terminal disclaimer.

(21) Appl. No.: 12/378,079

(22) Filed: Feb. 11, 2009

(65) Prior Publication Data
US 2010/0202778 A1   Aug. 12, 2010

(51) Int. Cl.
*H04J 14/02*   (2006.01)
(52) U.S. Cl. .......................................... 398/83; 398/48
(58) Field of Classification Search .............. 398/48–50, 398/83–85
See application file for complete search history.

(56) References Cited

U.S. PATENT DOCUMENTS

| 7,027,684 B2* | 4/2006 | Ducellier et al. ............... 385/24 |
| 7,336,867 B2 | 2/2008 | Wu et al. |
| 2008/0031570 A1 | 2/2008 | Fondeur et al. |
| 2009/0232497 A1* | 9/2009 | Archambault et al. ......... 398/50 |

* cited by examiner

*Primary Examiner* — Leslie Pascal (57) ABSTRACT

A system and method for dynamically adding/dropping wavelengths in a reconfigurable optical add-drop multiplexer (ROADM) transport network is disclosed. The system includes a plurality of M×N wavelength selective switches (WSS) for locally dropping selected wavelengths at a node, where each M×N WSS has M inputs connected to optical fan-out devices in each of M network degrees, and a plurality of M×N wavelength selective switches for locally adding selected wavelengths to a node, where each M×N WSS has M outputs connected to optical fan-in devices in each of M network degrees. Several expedients of M×N wavelength selective switches comprising M switching elements for use in the system are also disclosed.

18 Claims, 7 Drawing Sheets

SHARED, COLORLESS ADD/DROP CONFIGURATION FOR A ROADM NETWORK USING M×N WAVELENGTH SWITCHES

FIELD OF THE INVENTION

The present invention relates generally to optical networks, and more particularly, to a methodology and system for enabling shared, colorless add/drop in a ROADM node based on using M×N Wavelength Selective Switches (WSS), and proposing M×N WSS designs that are optimized for the shared add/drop application.

BACKGROUND OF THE INVENTION

In less than a decade, the state of the art in fiber-optic transport systems has progressed from simple point-to-point chains of optically amplified fiber spans to massive networks with hundreds of optically amplified spans connecting transparent add/drop nodes spread over transcontinental distances. Cost reduction has been the primary driver for this transformation, and the primary enabler has been the emergence of the reconfigurable optical add/drop multiplexer (ROADM) as a network element (NE).

Exploiting the inherent wavelength granularity of wavelength-division multiplexing (WDM), an optical add/drop multiplexer (OADM) allows some WDM channels (also referred to as wavelengths) to be dropped at a node, while the others traverse the same node without electronic regeneration. Previously, it was necessary to terminate line systems at each node served, and then regenerate the wavelength signals destined for other nodes. The ability to optically add/drop a fraction of a system's wavelengths at a node was first achieved using fixed OADMs. These were constructed from optical filters, and by enabling wavelengths to optically bypass nodes and eliminate unnecessary regeneration, they provided significant cost savings. However, because traffic growth is inherently unpredictable, it is advantageous for the add/drop capability to be reconfigurable.

ROADMs provide many advantages beyond the savings achieved by optically bypassing nodes. In the future, multi-degree ROADMs with adequate reconfiguration speeds may enable shared mesh-restoration at the optical layer. Shared mesh restoration significantly reduces the number of wavelength channels that must be installed as redundant protection circuits. ROADMs also provide operational advantages. Because ROADMs can be reconfigured remotely, they enable new wavelength channels to be installed by simply placing transponders at the end points, without needing to visit multiple intermediate sites. In addition to these cost-saving benefits, ROADMs will enable new services. For example, if transponders are preinstalled, then new circuits can be provided on-demand. The rapid network reconfiguration provided by ROADMs could also become an enabler of dynamic network services, such as switched video for IPTV. For all of these reasons, ROADMs will continue to have a significant effect on the design of optical networks.

Generally, a ROADM is defined as a NE that permits the active selection of add and drop wavelengths within a WDM signal, while allowing the remaining wavelengths to be passed through transparently to other network nodes. Thus, the simplest ROADM will have two line ports (East and West) that connect to other nodes, and one local port (add/drop) that connects to local transceivers. In today's networks, optical links are typically bidirectional, so each line port represents a pair of fibers. When using conventional local transceivers that can process only a single wavelength at a time, the number of fibers in the add/drop port sets the maximum number of wavelengths that can be added or dropped at a given node.

A ROADM with only two line ports (East and West) is referred to as a two-degree ROADM. Practical networks also have a need for multi-degree ROADMs that can serve more than two line ports. In addition to providing local add/drop of from each of its line ports, the multi-degree ROADM must be able to interconnect any individual wavelength from one line port to another, in a reconfigurable way. The degree of a multi-degree ROADM is equal to the number of line-side fiber pairs that it supports (it does not include the number of fiber pairs used in the add/drop portion of the ROADM).

A full ROADM provides add/drop (de)multiplexing of any arbitrary combination of wavelengths supported by the system with no maximum, minimum, or grouping constraints. A partial ROADM only has access to a subset of the wavelengths, or the choice of the first wavelength introduces constraints on other wavelengths to be dropped. The drop fraction of a ROADM is the maximum number of wavelengths that can be simultaneously dropped, divided by the total number of wavelengths in the WDM signal. If a given add or drop fiber is capable of handling any wavelength, it is said to be colorless. If a given add or drop fiber can be set to address any of the line ports (e.g., east or west for a 2-degree ROADM), it is said to be "steerable." A NE can be configured such that no single failure will cause a loss of add/drop service to any two of its line ports.

Carriers wish to deploy systems in the most cost-effective manner possible. Today, it is far more cost-effective to initially deploy the minimal amount of equipment that can smoothly evolve to meet future needs, rather than to deploy a fully loaded system configuration from the very beginning. Currently and for the foreseeable future, transponders make up the dominant cost of a fully loaded optical communication system. If a full set of transponders were included in the initial deployment, then a substantial cost would be incurred before the network had sufficient traffic to support the expense. Therefore, systems are routinely designed to permit incremental deployment of transponders on an as-needed basis. Similar considerations also apply to multiplexers, although the economic drivers are not as strong. In general, modular growth will be supported whenever the additional cost and complication of upgrading to higher capacity in the future is small compared to the financial impact of a full equipment deployment at startup. By designing this pay-as-you-grow approach into ROADMs, the network itself can grow in a cost-effective manner. Traditional networks grow by adding and interconnecting stand-alone line systems, incurring substantial cost and complexity. By using ROADMs that allow for modular deployment of additional ports, network growth can benefit from both the equipment and operational efficiencies of integrating line systems as they are needed into a seamless network. Because networks are deployed over the course of years, carriers prefer to be able to grow the nodes of the network from terminals or amplifiers into multi-degree ROADMs. This not only allows the expense to be spread out over years, it also enables the network designers to respond to unforeseen traffic growth patterns.

Figure 1:
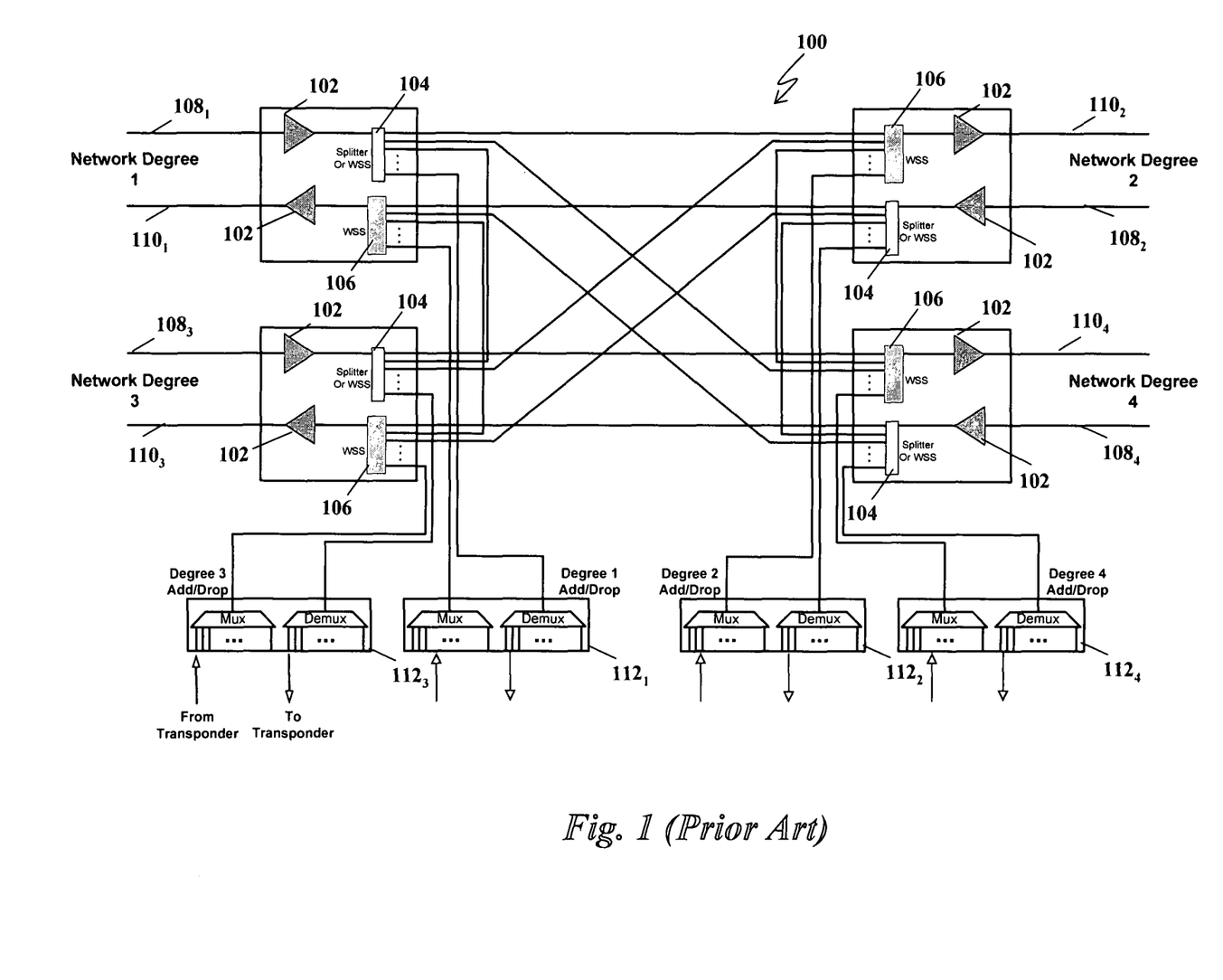
FIG. 1 is a schematic of a prior art multi-degree ROADM system.

FIG. 1 is a schematic of a prior art multi-degree ROADM system 100 (four network degrees are shown). Each network degree is coupled to a pair of optical amplifiers 102, with an input connected to a 1×N optical fan-in device, i.e., a power splitter (PS) or wavelength selective switch (WSS) 104), and an output connected to a N×1 optical fan-out device, i.e., WSS 106. Multiplexed optical signals on input $108_1$ from network degree 1 are selectively directed via PS/WSS 104 to WSS 106 and associated outputs $110_2$, $110_3$ and/or $110_4$ for network degrees 2, 3 and/or 4, respectively. In the same manner, multiplexed optical signals on inputs $108_2$, $108_3$ and $108_4$ (network degrees 2, 3 and 4) may be similarly routed to the other network degrees of the system. A plurality of multiplexer/demultiplexer assemblies $112_1$, $112_2$, $112_3$, and $112_4$ are connected to the WSSs 106 and PS/WSSs 104 for locally adding/dropping wavelengths to/from each network degree 1, 2, 3 and 4 by WSSs 106 and PC/WSSs 104. In this implementation, the add/drop wavelengths cannot be redirected between the network degrees because the multiplexers and demultiplexers for the add/drop wavelengths are connected to only one of the degrees. Therefore, dynamic wavelength applications such as bandwidth on-demand, mesh restoration, or wavelength redistribution cannot be supported. In addition, current multiplexers and demultiplexers typically have fixed wavelength ports.

ROADM configurations have been proposed for supporting shared add/drop that utilize a WSS in at least one direction to select the desired network degree for each wavelength. These are combined with a colorless add/drop expedient that uses WSSs for the multiplexer and demultiplexer in a back-to-back WSS arrangement. An M×1 WSS selects the network degree, where M is the number of shared degrees, and a 1×N WSS utilized as a multiplexer and demultiplexer, where N is the number of add/drop ports. This cascaded configuration suffers from inherent drawbacks such as excessive insertion loss.

Another significant drawback of current shared add/drop ROADM designs is that only one instance of each wavelength can be supported among the degrees sharing the multiplexer and demultiplexer. This is true for both fixed-wavelength port designs and colorless port designs due to the limitations of current WSSs required to select the degree for each wavelength. This may require an additional shared multiplexer/demultiplexer due to wavelength availability restrictions, even when add/drop ports are still open.

It would therefore be desirable to provide systems and methods for enabling shared, colorless add/drop in a ROADM node employing M×N Wavelength Selective Switches (WSS) for multiplexing and demultiplexing signals, where M is the number of shared network degrees supported by the ROADM system. To the inventor's knowledge, no such system or method currently exists.

SUMMARY OF THE INVENTION

In accordance with an aspect of the present invention, a system is provided for dynamically adding/dropping wavelengths in a reconfigurable optical add-drop multiplexer (ROADM) transport network. The system generally comprises: a plurality of optical fan-out devices, each arranged to receive an input signal from a network degree and coupled to at least one of a plurality of optical fan-in devices, each optical fan-in device arranged to output a signal to a network degree, the optical fan-out devices comprising at least one wavelength selective switch and the optical fan-in devices comprising at least one wavelength selective switch, the optical fan-out devices and optical fan-in devices being connected so as to enable signals input from each of the plurality of network degrees to be switched to another network degree of the plurality of network degrees. Advantageously, a plurality of M×N wavelength selective switches for locally dropping selected wavelengths, where each M×N wavelength selective switch for locally dropping selected wavelengths having M inputs, is connected to M network degrees. Similarly, a plurality of M×N wavelength selective switches for locally adding selected wavelengths, where each M×N wavelength selective switch for locally adding selected wavelengths having M outputs, is connected to M network degrees.

In an exemplary embodiment, each of the M inputs of each M×N wavelength selective switch for locally dropping selected wavelengths is connected to an optical fan-out device of a network degree, and each of the M outputs of each M×N wavelength selective switch for locally adding selected wavelengths is connected to an optical fan-in device of a network degree.

In accordance with another aspect of the invention, each M×N wavelength selective switch comprises M switching elements for coupling M inputs or outputs to N inputs or outputs. Each switching element comprises in an illustrative expedient a multidimensional micro-mirror array (MEMS). The MEMS include a plurality of mirror elements rotatable around first and second orthogonal axes for independent wavelength routing. Each M×N WSS further comprises a plurality of focusing optics and a dispersive element disposed relative to the focusing optics. The dispersive element may be an arrayed waveguide grating (AWG).

In accordance with yet another aspect of the invention, each M×N WSS further comprises an M plurality of AWGs, and an additional two-dimensional switching element such that at least one of the focusing optics is disposed between the M switching elements and the additional two-dimensional switching element.

Another aspect of the invention provides a method for dynamically adding/dropping wavelengths in a reconfigurable optical add-drop multiplexer (ROADM) transport network that includes a plurality of optical fan-out devices, each arranged to receive an input signal from a network degree and coupled to at least one of a plurality of optical fan-in devices, each optical fan-in device arranged to output a signal to a network degree, the optical fan-out devices comprising at least one wavelength selective switch and the optical fan-in devices comprising at least one wavelength selective switch, the optical fan-out devices and optical fan-in devices being connected so as to enable signals input from each of the plurality of network degrees to be switched to another network degree of the plurality of network degrees. The method comprises: directing signals to a plurality of M×N wavelength selective switches for locally dropping selected wavelengths, each M×N wavelength selective switch for locally dropping selected wavelengths having M inputs connected to an optical fan-out device in each of M network degrees; and directing signals to a plurality of M×N wavelength selective switches for locally adding selected wavelengths, each M×N wavelength selective switch for locally adding selected wavelengths having M outputs connected to an optical fan-in device in each of M network degrees.

The method further comprises activating M switching elements in each M×N wavelength selective switch to effect switching between the M network degrees communicating with each wavelength selective switch.

These aspects of the invention and further advantages thereof will become apparent to those skilled in the art as the present invention is described with particular reference to the accompanying drawings.

DETAILED DESCRIPTION OF THE INVENTION

Embodiments of the invention will be described with reference to the accompanying drawing figures wherein like numbers represent like elements throughout to the extent possible. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 2:
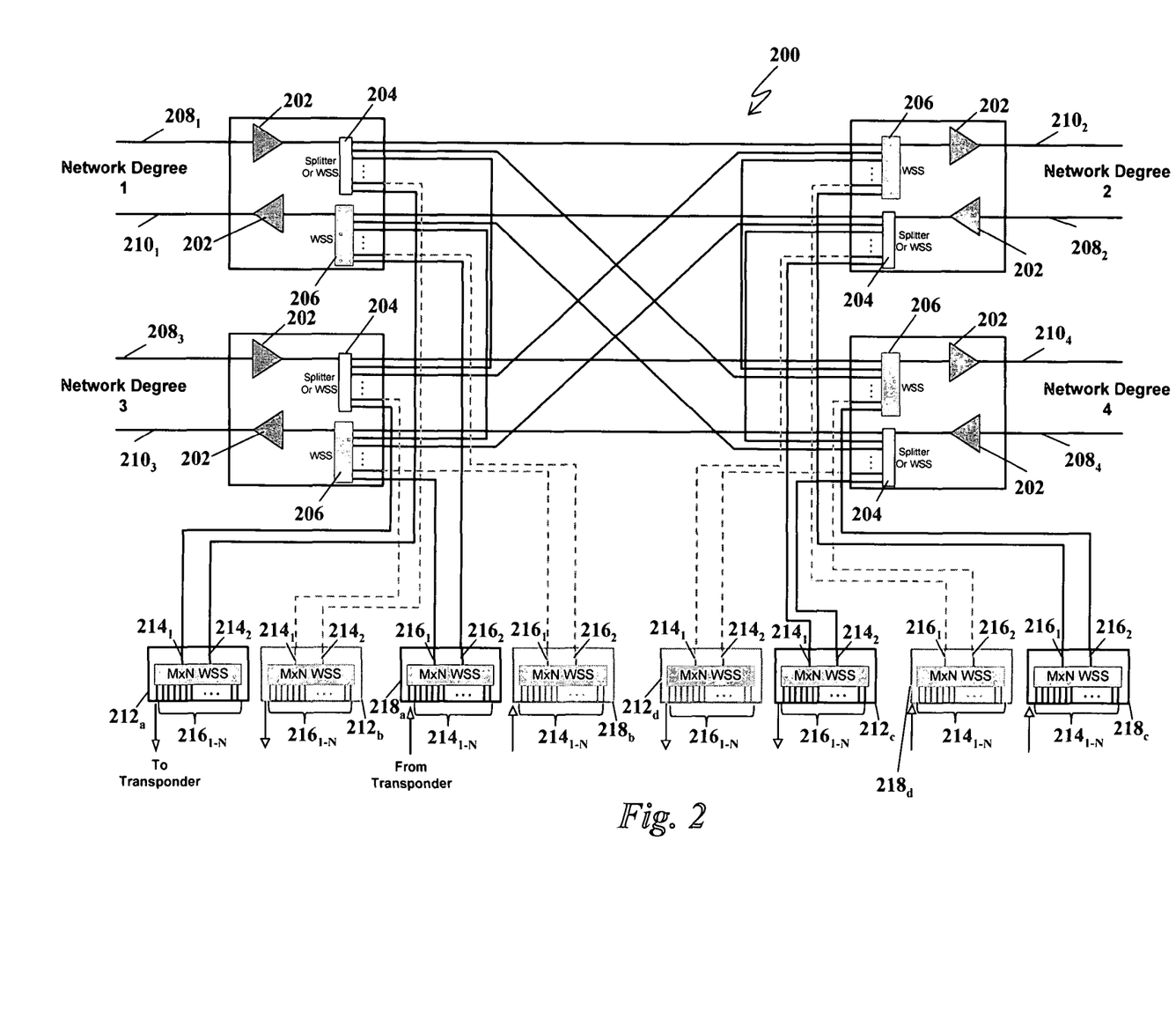
FIG. 2 is a schematic of an exemplary multi-degree ROADM system utilizing M×N WSSs in accordance with the present invention.

FIG. 2 is a schematic of an exemplary multi-degree ROADM system 200 in accordance with an aspect of the present invention. Four network degrees are depicted in the figure, with each degree having an input $208_1$, $208_2$, $208_3$, and $208_4$, respectively coupled to an amplifier 202 and a 1×N PS or WSS 204. Similarly, each degree has an output $210_1$, $210_2$, $210_3$ and $210_4$, respectively, coupled to an amplifier 202 and an N×1 WSS 206. As described above, WDM signals on any of the inputs $208_{1-4}$ may be switched to any of the outputs $210_{1-4}$ by the PSs/WSSs 204 and WSSs 206 serving each network degree.

In accordance with an aspect of the invention, a plurality of multiplexer (mux)/demultiplexer (demux) M×N WSSs are utilized to facilitate shared colorless add/drop where M equals the number of network degrees to which each WSS is connected and N is the number of add/drop ports. In the example shown, a first M×N WSS $212_a$ (demux) comprises M inputs ports $214_{1,2}$ that communicate with PS/WSSs 204 of network degrees 1 and 3, and N output ports $216_{1-N}$ that couple to up to N optical transponders (not shown). A second M×N WSS $212_b$ (demux) includes M input ports $214_{1,2}$ coupled to PS/WSSs 204 of network degrees 1 and 3, and N output ports $216_{1-N}$ that couple to up to N transponders (not shown). Similarly, third and fourth M×N WSSs $212_{c,d}$ (demux) are connected to PS/WSSs 204 of network degrees 2 and 4. Each WSS $212_{c,d}$ comprises M input ports $214_{1,2}$ and output ports $216_{1-N}$ as described above. ROADM system 200 additionally includes first and second M×N WSSs $218_{a,b}$ (mux), each comprising N input ports $214_{1-N}$ that couple to up to N optical transponders (not shown) and M output ports $216_{1,2}$ (for M=2) communicating with WSSs 206 in network degrees 1 and 3. Similarly, third and fourth M×N WSSs $218_{c,d}$ (mux) each comprise N input ports $214_{1-N}$ communicating with up to N optical transponders (not shown) and M output ports $216_{1,2}$ coupled to WSSs 206 of network degrees 2 and 4.

Figure 3:
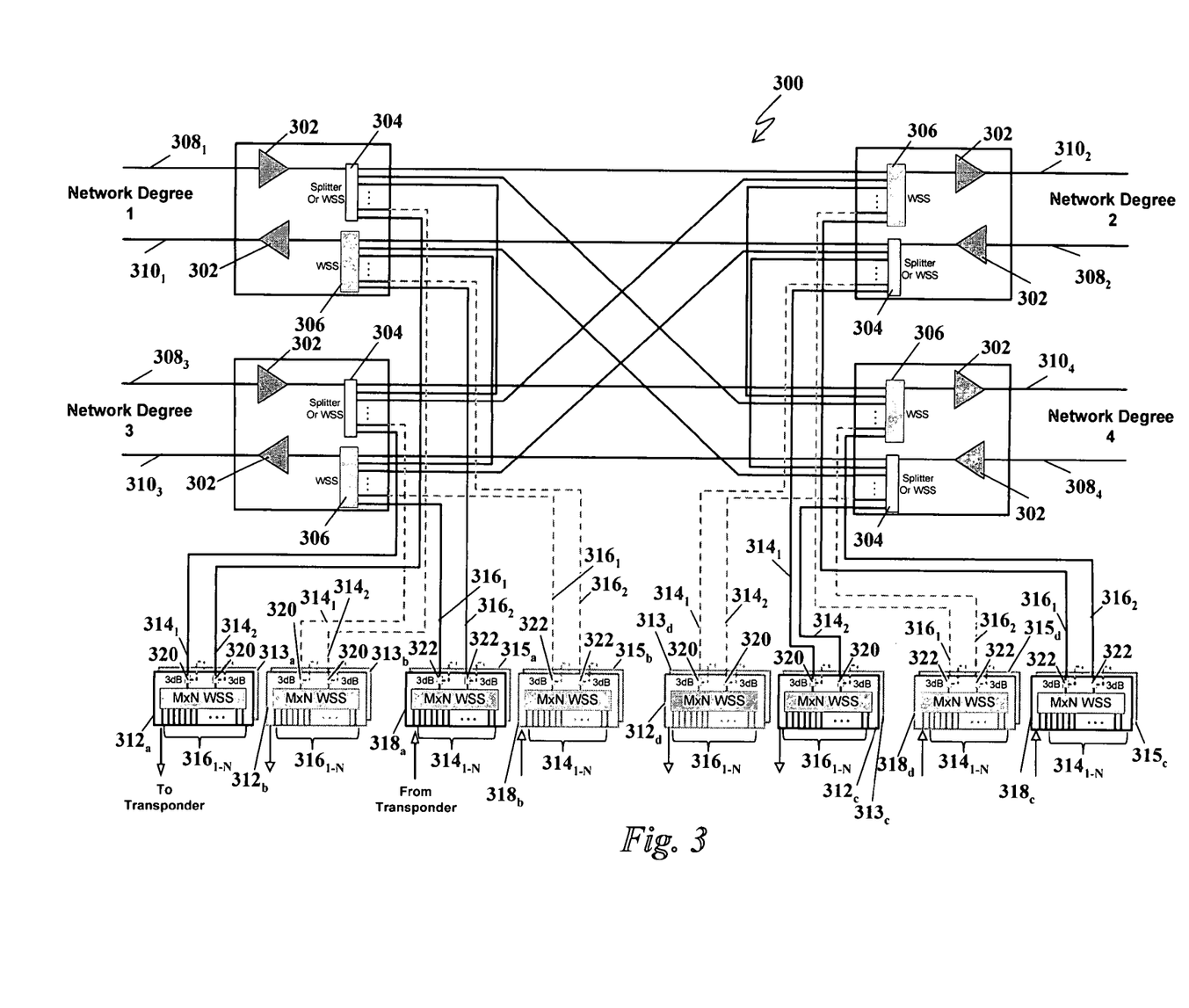
FIG. 3 is a schematic of another exemplary multi-degree ROADM system utilizing M×N WSSs that adds a splitter for increasing the number of M×N WSSs in accordance with the present invention.

FIG. 3 is a schematic of an exemplary multi-degree ROADM system 300 in accordance with another aspect of the present invention, that supports a total of M×2N add/drop wavelengths. This configuration enables the utilization of a lower cost WSS (smaller N) without requiring more than M ROADM degree ports to be used for add/drop ports by incorporating splitters to increase the number of WSSs (mux and demux) connected to the network degrees. As in the embodiment of FIG. 2, four network degrees are depicted in the figure, with each degree having an input $308_1$, $308_2$, $308_3$, and $308_4$, respectively coupled to an amplifier 302 and a 1×N PS or WSS 304. Similarly, each degree has an output $310_1$, $310_2$, $310_3$ and $310_4$, respectively, coupled to an amplifier 302 and an N×1 WSS 306. As described above, WDM signals on any of the inputs $308_{1-4}$ may be switched to any of the outputs $310_{1-4}$ by the PSs/WSSs 304 and WSSs 306 serving each network degree. In the example shown, a first M×N WSS $312_a$ (demux) comprises M inputs ports $314_{1,2}$ that communicate with PS/WSSs 304 of network degrees 1 and 3, and N output ports $316_{1-N}$ that couple to up to N optical transponders (not shown). A second M×N WSS $312_b$ (demux) includes M input ports $314_{1,2}$ coupled to PS/WSSs 304 of network degrees 1 and 3, and N output ports $316_{1-N}$ that couple to up to N transponders (not shown). Similarly, third and fourth M×N WSSs $312_{c,d}$ (demux) are connected to PS/WSSs 304 of network degrees 2 and 4. Each WSS $312_{c,d}$ comprises M input ports $314_{1,2}$ and output ports $316_{1-N}$ as described above. ROADM system 300 additionally includes first and second M×N WSSs $318_{a,b}$ (mux), each comprising N input ports $314_{1-N}$ that couple to up to N optical transponders (not shown) and M output ports $316_{1,2}$ (for M=2) communicating with WSSs 306 in network degrees 1 and 3. Similarly, third and fourth M×N WSSs $318_{c,d}$ (mux) each comprise N input ports $314_{1-N}$ communicating with up to N optical transponders (not shown) and M output ports $316_{1,2}$ coupled to WSSs 306 of network degrees 2 and 4. In this embodiment, a plurality of splitters 320 enable an additional M×N WSS $313_{a-d}$ to be respectively connected to PS/WSSs 204 of network degrees 1 and 3, and 2 and 4, respectively. Similarly, splitters 322 permit an additional WSS $315_{a-d}$ to be respectively coupled to WSS 306 of network degrees 2 and 4.

Figure 4:
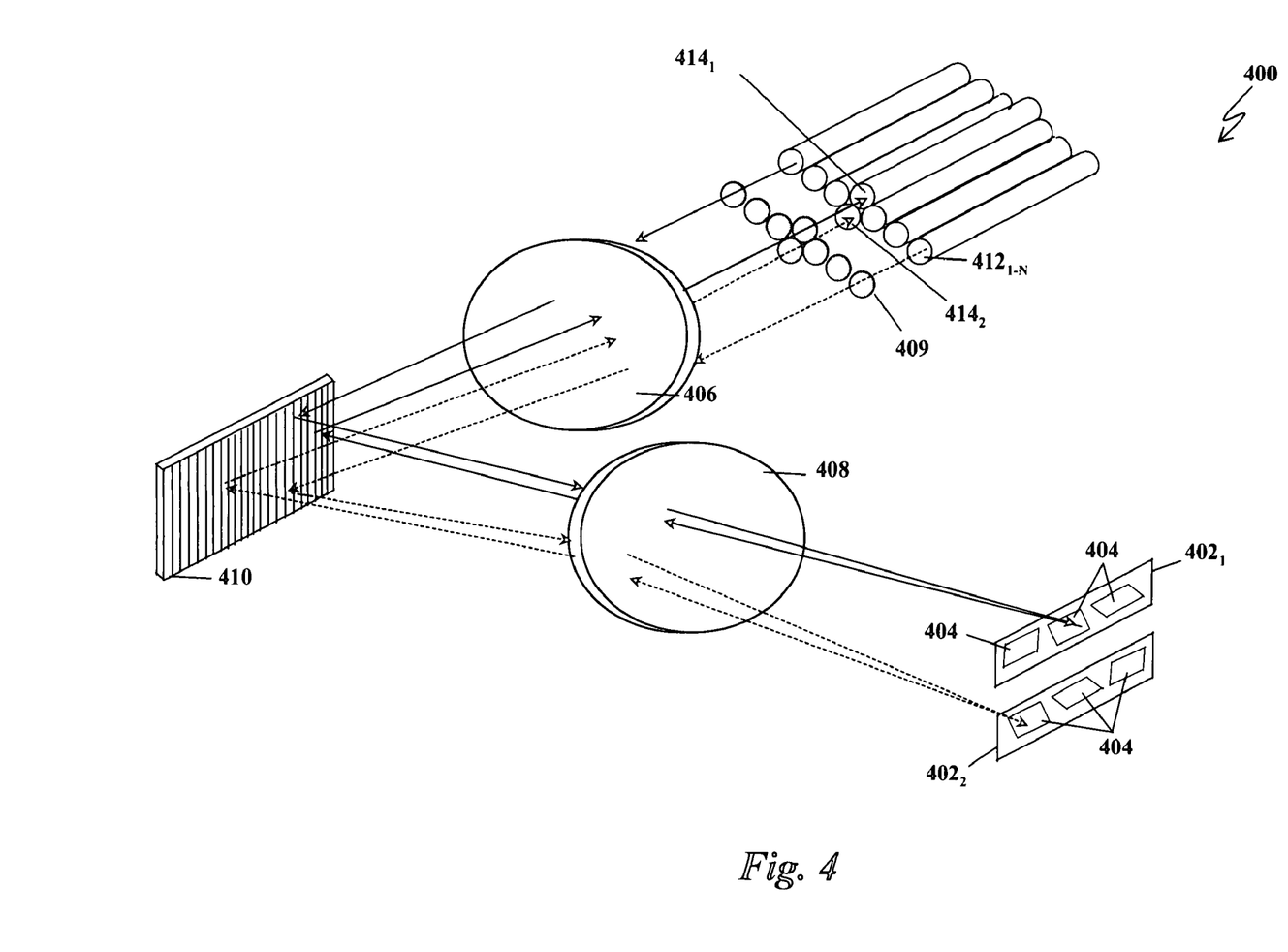
FIG. 4 is a schematic of a first exemplary embodiment of a M×N WSS in accordance with an aspect of the invention.

FIG. 4 is a schematic of a first embodiment of an exemplary M×N WSS 400 that may be employed in the ROADM system described above and illustrated in FIGS. 2 and 3. WSS 400 advantageously comprises M (as shown, for M=2) switching elements, each switching element embodied as a multidimensional micro-mirror array $402_1$, $402_2$. Each array $402_1$, $402_2$ consists of a plurality of mirror elements 404 arranged as Micro-Electro-Mechanical Systems (MEMS) or other types of known beam steering device of the type well known in the art. The mirrors are rotatable around first and second orthogonal axes for independent wavelength routing by tilting the mirror. Although M switching elements are shown in FIG. 4, it will be appreciated by those skilled in the art that one switching element (or any number less than M) may be employed within the scope of the invention, with M being preferred to prevent wavelength blocking. The M arrays $402_1$, $402_2$ cooperate with a first focusing optics 406, second focusing optics 408, and third focusing optics 409 (a plurality of individual elements) to collimate and disperse the optical beams passing through the WSS in either direction by dispersive element 410 to effectuate multiplexing or demultiplexing between the selected M and N ports. Individual wavelength channels are either input to the WSS 400 through N inputs 412 (for multiplexing) and multiplexed to either of M outputs 414, or M inputs 414 are demultiplexed to N outputs 412 in the reverse direction. Each wavelength channel is focused onto a corresponding mirror in one of the arrays $402_1$, $402_2$ by collectively moving focusing optics 406 and 408. In accordance with an aspect of the present invention, each array 402 is associated with a particular input/output of the M instances of each wavelength. The dispersive element 410 may be a conventional diffraction grating of the type known to those skilled in the art. It will understood that although the illustrated example and description in the foregoing shows M=2, M may be greater than 2 to accommodate the desired configuration. Distortion of the optical spectrum due to diffraction effects, however, can limit the number of wavelength channels. Existing solutions that have been employed in current WSS expedients may be applied to an M×N WSS as disclosed herein.

Figure 5:
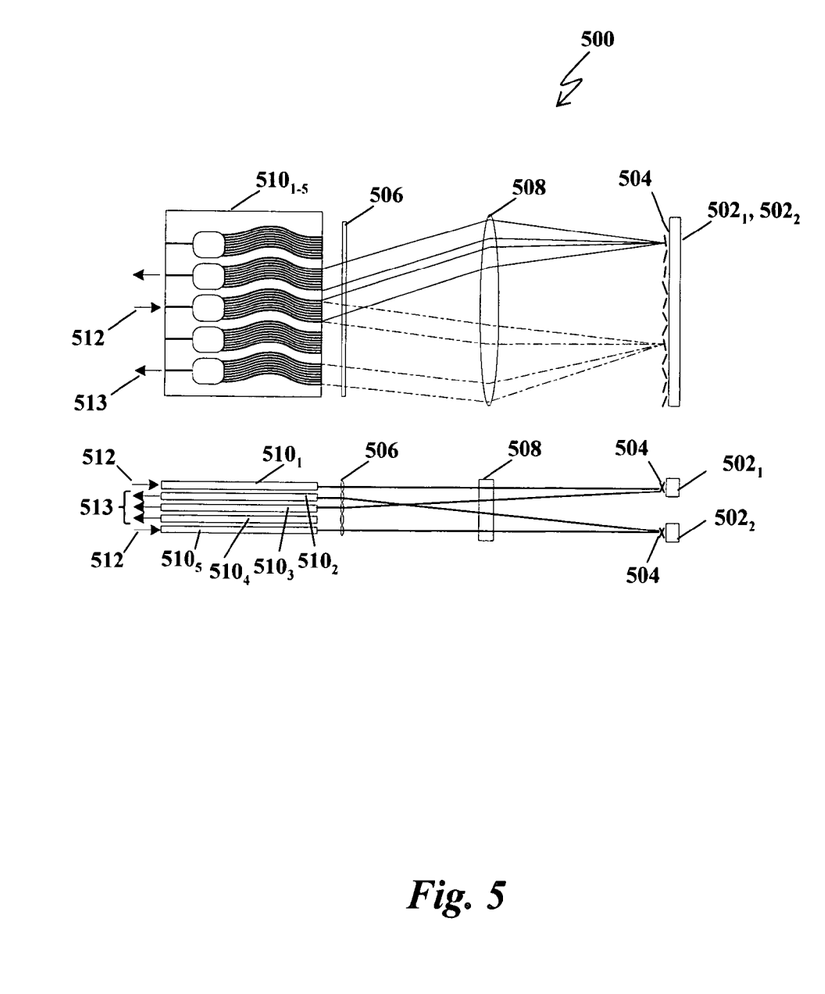
FIG. 5 is a schematic of another exemplary embodiment of a M×N WSS configuration.

FIG. 5 is a schematic of another embodiment of a WSS 500 that employs an arrayed waveguide grating (AWG) 510 as a dispersive element of the type known in the art. The WSS 500 includes M (as shown, for M=2) switching elements, each switching element embodied as a multidimensional micromirror array $502_1$, $502_2$ as described above with respect to the embodiment of FIG. 4. For a multiplexing WSS, as shown a plurality of planar lightwave circuits (PLCs) $510_1$, $510_2$, $510_3$, $510_4$ and $510_5$ each comprise an input arrayed waveguide grating (AWG) 512 and a plurality of output AWGs 513. It will be appreciated by those skilled in the art that each PLC may comprise any combination of input or output AWGs, where the specific configuration depends on the particular optical design. An input optical signal that enters the AWG is dispersed into constituent wavelengths that are directed through focusing optics 506 and 508 to the M arrays $502_1$, $502_2$. The light is collimated by focusing optics 506 and steered to the selected array $502_1$, $502_2$ by focusing optics 508. Each wavelength channel is directed to a mirror 504 of the corresponding mirror array $502_1$, $502_2$ and reflected back through the focusing optics 506, 508 to a port of the AWG for recombination (multiplexing) or individually (demultiplexing). The mirrors 504 of the mirror arrays $502_1$, $502_2$ are rotatable around first and second orthogonal axes for independent wavelength routing by tilting the mirror as in the embodiment shown in FIG. 4.

Figure 6:
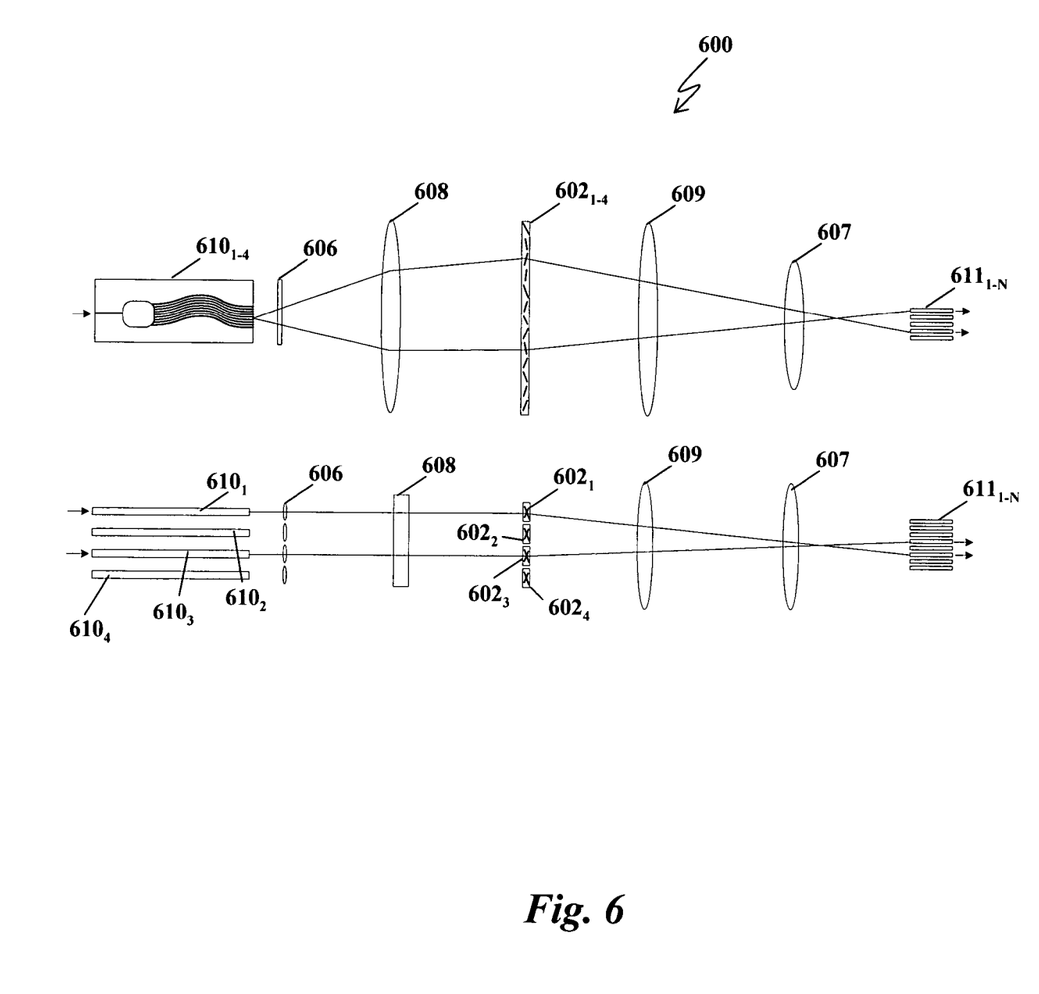
FIG. 6 is a schematic of yet another exemplary embodiment of a M×N WSS configuration.

FIG. 6 is a schematic of an illustrative WSS 600 for a M=4×N mux configuration in accordance with another aspect of the invention, that comprises a dispersive element $610_1$, $610_2$, $610_3$ and $610_4$ in the form of an AWG for each of M=4 input ports. The incoming optical beams travel unidirectionally from the M dispersive elements $610_{1-4}$ to an array of N output ports $611_{1-N}$ through first focusing optics 606, second focusing optics 608, a plurality of M switching elements $602_1$, $602_2$, $602_3$ and $602_4$, third focusing optics 609 and fourth focusing optics 607. This arrangement may also be used for a demux configuration. In either implementation, the N ports are limited to a single wavelength.

Figure 7:
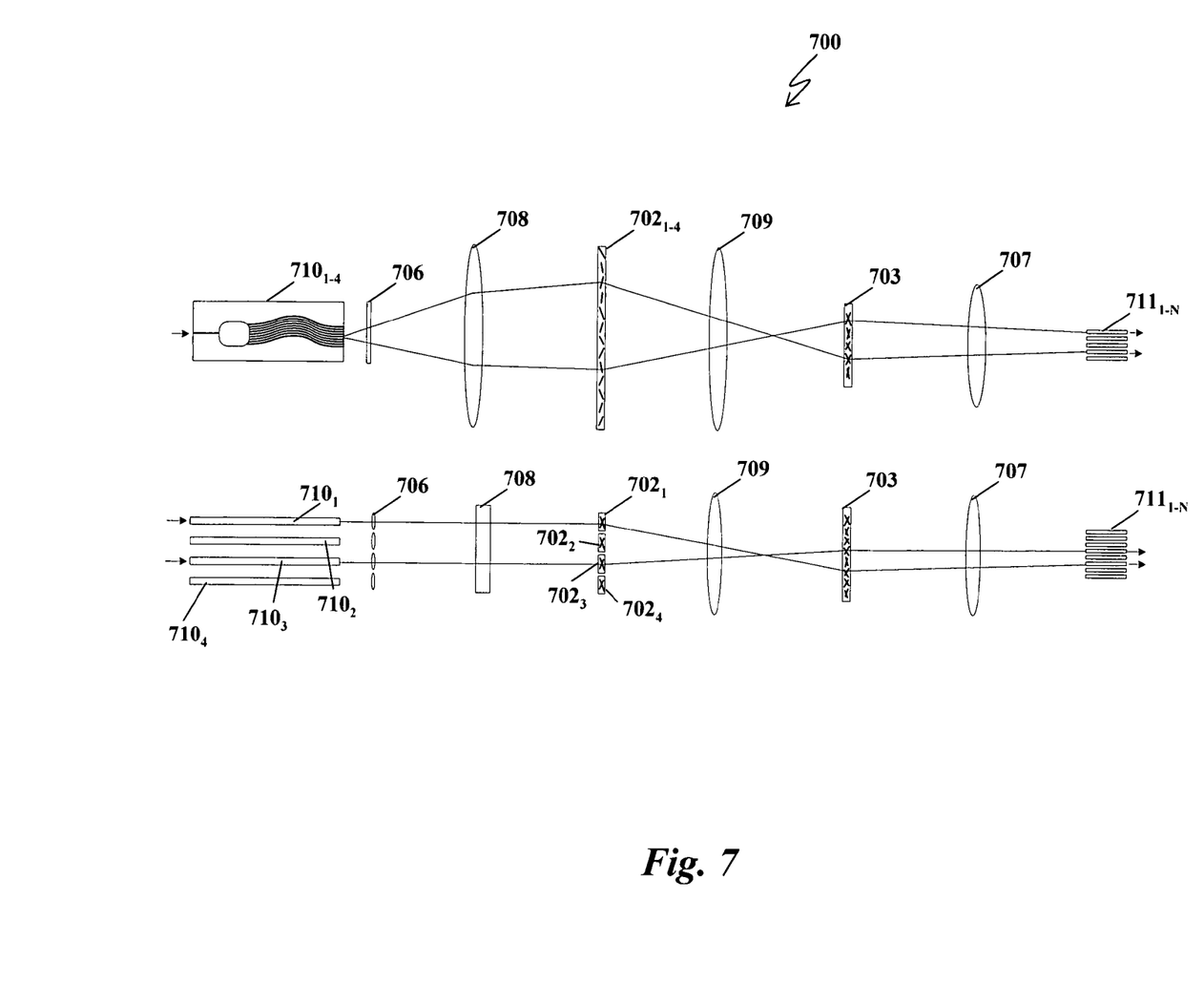
FIG. 7 is a schematic of another exemplary embodiment of an M×N WSS configuration.

FIG. 7 is a schematic of an exemplary WSS 700 for a M=4×N mux configuration similar to the embodiment of FIG. 6, but where an additional 2D switching element 703 has been added to support a larger number of N output ports $711_{1-N}$. The other components are the same as those described above with respect to FIG. 6. A dispersive element $710_1$, $710_2$, $710_3$ and $710_4$ is provided in the form of an AWG for each of M=4 input ports. The incoming optical beams travel unidirectionally from the M dispersive elements $710_{1-4}$ to the array of N output ports $711_{1-N}$ limited to a single wavelength through first focusing optics 706, second focusing optics 708, a plurality of M switching elements $702_1$, $702_2$, $702_3$ and $702_4$, third focusing optics 709 and fourth focusing optics 707. The additional 2D switching element 703 (MEMS array or the like) is disposed between third focusing optics 709 and fourth focusing optics 707 to support the larger values of N output ports. Like the embodiment depicted in FIG. 6, this arrangement may also be used for a demux configuration.

It will be appreciated by those skilled in the art that the recitation of an AWG as the dispersive element is intended to be merely illustrative as other diffractive elements in lieu of the AWG, as well as alternative switch elements such as those that employ transmissive technologies instead of the MEMS arrays shown and described herein, may be employed within the scope of the invention.

The benefits of the proposed shared, colorless add/drop configurations and the proposed M×N WSS implementations enable an economic solution for supporting shared, colorless add/drop in a multi-degree ROADM node. This in turn can provide new and more economical dynamic wavelength capabilities to support new services and allow more efficient use of network bandwidth.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A system for dynamically adding/dropping wavelengths in a reconfigurable optical add-drop multiplexer transport network having a plurality of optical transponders comprising:
  a plurality of optical fan-out devices, each arranged to receive an input signal from a network degree and coupled to a plurality of optical fan-in devices, each optical fan-in device arranged to output a signal to a network degree, the optical fan-out devices comprising a plurality of wavelength selective switches and the optical fan-in devices comprising a plurality of wavelength selective switches, the optical fan-out devices and optical fan-in devices being connected so as to enable signals input from each of a plurality of network degrees to be switched to another network degree of the plurality of network degrees;
  a plurality of M×N wavelength selective switches for locally dropping selected wavelengths, each M×N wavelength selective switch for locally dropping selected wavelengths having M inputs connected to M network degrees;
  a plurality of M×N wavelength selective switches for locally adding selected wavelengths, each M×N wavelength selective switch for locally adding selected wavelengths having M outputs connected to M network degrees; and
  an optical coupler for adding an additional wavelength selective switch to each network degree.

2. The system of claim 1, wherein each of the M inputs of each M×N wavelength selective switch for locally dropping selected wavelengths is connected to an optical fan-out device of a network degree.

3. The system of claim 1, wherein each of the M outputs of each M×N wavelength selective switch for locally adding selected wavelengths is connected to an optical fan-in device of a network degree.

4. The system of claim 1, wherein each M×N wavelength selective switch comprises M switching elements.

5. The system of claim 4, wherein each M×N wavelength selective switch further comprises a plurality of focusing optics and a dispersive element disposed relative to the focusing optics.

6. The system of claim 5, wherein the dispersive element in each M×N wavelength selective switch further comprises a arrayed waveguide grating.

7. The system of claim 6 wherein each M×N wavelength selective switch further comprises a plurality of arrayed waveguide gratings, and an additional two-dimensional switching element such that a focusing optic is disposed between the M switching elements and the additional two-dimensional switching element.

8. The system of claim 1, wherein each switching element comprises a multidimensional micro-mirror array.

9. The system of claim 8, wherein each multidimensional micro-mirror array comprises a plurality of mirror elements rotatable around first and second orthogonal axes for independent wavelength routing.

10. The A system for dynamically adding/dropping wavelengths in a reconfigurable optical add-drop multiplexer transport network having a plurality of optical transponders, comprising:
a plurality of optical fan-out devices, each arranged to receive an input signal from a network degree and coupled to a plurality of optical fan-in devices, each optical fan-in device arranged to output a signal to a network degree, the optical fan-out devices comprising a plurality of wavelength selective switches and the optical fan-in devices comprising a plurality of wavelength selective switches, the optical fan-out devices and optical fan-in devices being connected so as to enable signals input from each of a plurality of network degrees to be switched to another network degree of the plurality of network degrees;
a plurality of M×N wavelength selective switches for locally dropping selected wavelengths, each M×N wavelength selective switch for locally dropping selected wavelengths having M inputs connected to an optical fan-out device in each of M network degrees;
a plurality of M×N wavelength selective switches for locally adding selected wavelengths, each M×N wavelength selective switch for locally adding selected wavelengths having M outputs connected to an optical fan-in device in each of M network degrees;
an optical coupler for adding an additional wavelength selective switch to each network degree;
wherein each M×N wavelength selective switch comprises M switching elements.

11. The system of claim 10, wherein each switching element comprises a multidimensional micro-mirror array.

12. The system of claim 11, wherein each multidimensional micro-mirror array comprises a plurality of mirror elements rotatable around first and second orthogonal axes for independent wavelength routing.

13. The system of claim 11, wherein each M×N wavelength selective switch further comprises a plurality of focusing optics and a dispersive element disposed relative to the focusing optics.

14. The system of claim 13, wherein the dispersive element in each M×N wavelength selective switch further comprises an arrayed waveguide grating.

15. The system of claim 14, wherein each M×N wavelength selective switch further comprises a plurality of arrayed waveguide gratings, and an additional two-dimensional switching element such that a focusing optic is disposed between the M switching elements and the additional two-dimensional switching element.

16. A method for dynamically adding/dropping wavelengths in a reconfigurable optical add-drop multiplexer transport network including a plurality of optical fan-out devices, each arranged to receive an input signal from a network degree and coupled to a plurality of optical fan-in devices, each optical fan-in device arranged to output a signal to a network degree, the optical fan-out devices comprising at least one wavelength selective switch and the optical fan-out devices and optical fan-in devices being connected so as to enable signals input from each of a plurality of network degrees to be switched to another network degree of the plurality of network degrees, the method comprising:
directing signals to a plurality of M×N wavelength selective switches for locally dropping selected wavelengths, each M×N wavelength selective switch for locally dropping selected wavelengths having M inputs connected to an optical fan-out device in each of M network degrees;
directing signals to a plurality of M×N wavelength selective switches for locally adding selected wavelengths, each M×N wavelength selective switch for locally adding selected wavelengths having M outputs connected to an optical fan-in device in each of M network degrees; and
directing signals to an additional wavelength selective switch coupled to each network degree using an optical coupler.

17. The method of claim 16, further comprising activating M switching elements in each M×N wavelength selective switch to effect switching between the M network degrees communicating with each wavelength selective switch.

18. The method of claim 17, wherein each of the M switching elements comprises a multidimensional micro-mirror array.

* * * * *

UNITED STATES PATENT AND TRADEMARK OFFICE
CERTIFICATE OF CORRECTION

PATENT NO. : 8,111,995 B2
APPLICATION NO. : 12/378079
DATED : February 7, 2012
INVENTOR(S) : Philip Wisseman It is certified that error appears in the above-identified patent and that said Letters Patent is hereby corrected as shown below:

Title Page, Item (54) and at Column 1, lines 1-4,
The current Title of "Shared, Colorless Add/Drop Configuration for a ROADM Network Using MxN Wavelength Switches" should read -- Shared, Colorless Add/Drop Configurations for a ROADM Network Using MxN Wavelength Switches --

In Claim 10, Column 9, line 21, "The A system for dynamically..." should read -- A system for dynamically... --

Signed and Sealed this
Twelfth Day of June, 2012

David J. Kappos
*Director of the United States Patent and Trademark Office*